United States Patent [19]
Erickson

[11] 4,289,610
[45] Sep. 15, 1981

[54] APPARATUS FOR PUMPING AND CONDITIONING DRILLING FLUID

[75] Inventor: John W. Erickson, Huntington Beach, Calif.

[73] Assignee: Kobe, Inc., City of Commerce, Calif.

[21] Appl. No.: 23,207

[22] Filed: Mar. 23, 1979

[51] Int. Cl.[3] ........................ B04B 11/00; B01D 45/12

[52] U.S. Cl. ........................................ 209/18; 55/203; 55/345; 55/403; 209/490; 209/494; 209/488

[58] Field of Search ................. 55/191, 203, 345, 401, 55/403, 408, 409, 438; 209/18, 156, 451, 494, 488; 415/88

[56] References Cited

U.S. PATENT DOCUMENTS

| | | | |
|---|---|---|---|
| 1,554,726 | 9/1925 | Hoffman | 55/403 |
| 2,753,010 | 7/1956 | Walther | 55/191 |
| 3,240,003 | 3/1966 | Stroup et al. | 55/408 |
| 3,686,831 | 8/1972 | Libby | 55/403 |
| 3,817,659 | 6/1974 | Erickson et al. | 417/84 |
| 4,113,452 | 9/1978 | Brown et al. | 55/203 |
| 4,161,448 | 7/1979 | Erickson et al. | 55/203 X |

FOREIGN PATENT DOCUMENTS

| | | | |
|---|---|---|---|
| 733263 | 3/1943 | Fed. Rep. of Germany | 55/403 |

*Primary Examiner*—John Adee
*Attorney, Agent, or Firm*—William C. Norvell, Jr.

[57] ABSTRACT

The invention relates to an apparatus for pumping and conditioning a drilling fluid normally utilized in the drilling, completion or workover of a subterranean oil or gas well. The apparatus includes a rotor housing encasing a rotatably supported rotor assembly and means for driving the rotor assembly. The rotor assembly is divided into first and second chambers. The first chamber has a radial acceleration passage, connected between an inlet for the drilling fluid and a peripheral portion of the chamber, and means for collecting a first component of the drilling fluid, the drill chips, which are the heaviest, and are forced to the periphery of the first chamber. The second chamber also has a radial acceleration passage which is connected between the first chamber and a peripheral portion of the second chamber and has a first pickup means stationarily mounted for collecting a second component, barite, at the periphery of the second chamber, a second pickup means stationarily mounted for collecting a third component, bentonite, intermediate the periphery and the center of the second chamber, and means for collecting a fourth component, gases, at the center of the second chamber. The barite and bentonite can then be recycled in the drilling fluid.

3 Claims, 2 Drawing Figures

APPARATUS FOR PUMPING AND CONDITIONING DRILLING FLUID

BACKGROUND OF THE INVENTION

1. Field of the Invention

The invention relates to a drilling fluid pump and conditioner. More specifically, the invention relates to a unitary device capable of accepting drilling fluids containing barite, bentonite, dissolved gases and drilled solids from a subterranean well and simultaneously pumping and segregating the above components.

2. Description of the Prior Art

Drilling fluids are used to cool and lubricate a working drill bit, carry away cuttings formed beneath the bit, and cleanse the bottom of the bore hole of such cuttings. Generally, the drilling fluids contain a number of components which aid in preventing well blowouts, lend viscosity properties to the drilling fluid, lower the filter loss of the liquid component into a permeable subterranean formation and serve similar advantageous functions.

Most drilling fluids contain three major components when they are circulated out of the well. These components are barite, bentonite, and drilled solids or cuttings along with some amounts of dissolved well gases. Barite is used as a weighting agent to prevent blowouts of the well, while bentonite is used, along with other valuable recoverable chemicals, to impart viscosity and filtration properties to the drilling fluid. It is desirable to recover the barite and bentonite fractions of the drilling fluid while disposing of the drilled chips or cuttings so that the drilling fluid can be recycled at the well site. Additionally, it is occasionally advantageous to segregate and recover dissolved well gases.

Presently, there are a number of known methods used to attempt to separate the valuable portions of drilling fluid circulated out of a well from the undesirable drilled solids such as clay, sand, siliceous material, and other fragmented portions of the subterranean structure being drilled through. One such system accepts the drilling fluid from a well, screens the drilling fluid to exclude large fragmentary portions, and cycles the remaining fluid to a separator. The separator, on the initial pass therethrough of the fluid, removes heavy solids from the fluid and cycles the remaining fluid to a holding tank. After one cycle is completed, the fluid collected in the holding tank is cycled through the separator thereby separating intermediate and low density particles which are separately collected and treated. Such systems require substantial investment in holding tanks, valving systems, piping, process control electronics and similar associated devices. This expense is a detriment to the usefulness of such systems.

Similarly, in the past, attempts have been made to use centrifuges to separate drilling fluids into solid and liquid portions, with a part of the solid material being returned to the drilling fluid. These attempts have not been altogether successful owing to the somewhat thixotrophic characteristic of the drilling fluid which substantially retard normal centrifugation.

Fluocculation methods have also been used to separate certain solids from the drilling fluid. Again, the somewhat thixotrophic nature of conventional aqueous or invert drilling fluids interferes with fluocculation methods of separating solids. Additionally, large amounts of fluocculants are used in such procedures, increasing the cost of the methods. Therefore, there is a need in the market place for a simple, reliable method of separating components of drilling fluids without the use of costly centrifugation and fluocculation methods or the use of multiple passes through a single particle separator.

SUMMARY OF THE INVENTION

The present invention relates to a centrifugal pump for selectively separating the different weight components of a drilling fluid. The pump includes an enclosed rotor housing having an inlet for the drilling fluid and at least one outlet for the components. The pump also includes a rotor assembly rotatably supported within the housing and drive means for rotating the rotor assembly. The rotor assembly is divided into first and second chambers with a peripheral portion of the first chamber connected to the rotor housing inlet by a radial passage formed in one end wall of the first chamber. A plurality of nozzles formed in the peripheral wall of the first chamber and/or a pickup means stationarily mounted within the first chamber collect the heaviest weight component, the drill chips. The nozzles discharge into an interhousing space formed between the rotor housing and the rotor assembly and the pickup means is connected to the rotor housing outlet.

A peripheral portion of the second chamber is connected to the first chamber by a radial passage formed in an end wall separating the first and second chambers. A first pickup means is stationarily mounted in the second chamber for collecting the next heaviest component, barite, at the periphery of the second chamber. A second pickup means is stationarily mounted in the second chamber for collecting the third heaviest component, bentonite, intermediate the periphery and the center of the second chamber. These first and second pickup means are independently connected to the rotor housing outlet. The second chamber also includes a means for collecting the lightest weight component, the gases, such as a passage formed in the other end wall having an inlet positioned near the center of the chamber for connecting with an interhousing space formed between the rotor housing and the rotor assembly.

DESCRIPTION OF THE PREFERRED EMBODIMENTS

Figure 2:
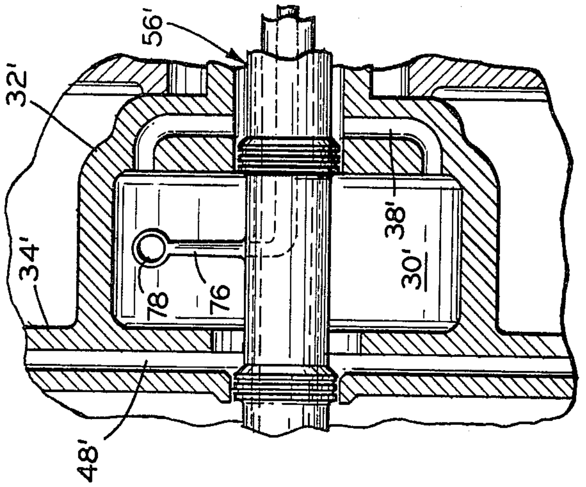
FIG. 2 is a fragmentary, sectional, elevational view which illustrates an alternative embodiment of the invention illustrated in FIG. 1.
Figure 1:
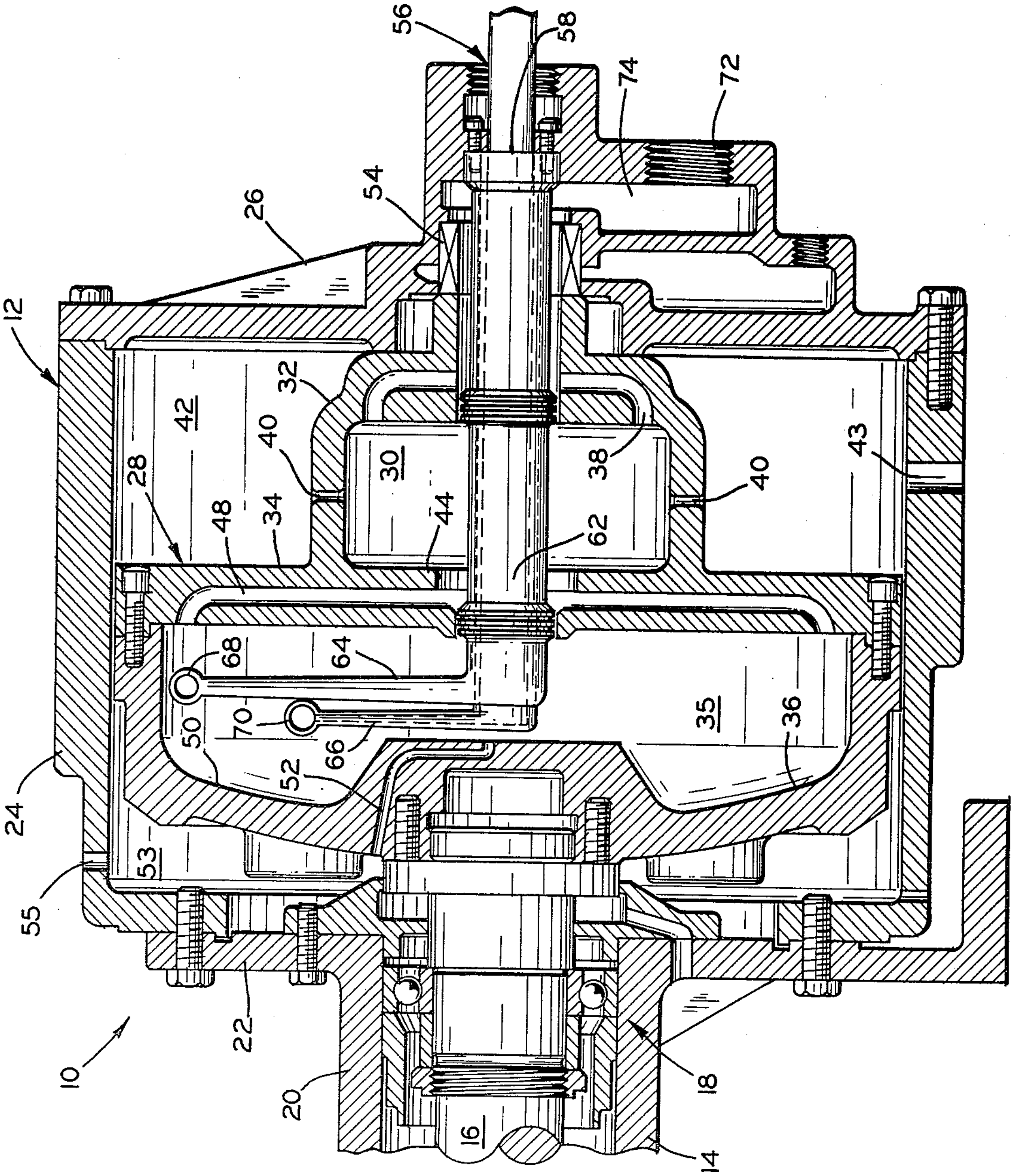
FIG. 1 is a sectional, elevational view of the drilling fluid pump and conditioner according to the present invention.

Referring to the drawings, there is shown a drilling fluid separator and conditioner apparatus which accepts drilling fluid or so-called drilling mud from a source, such as an oil well, and pressurizes while conditioning the fluid. The apparatus operates to accept the drilling mud and pressure pump the mud back to the well or to a holding tank while simultaneously conditioning the mud be separating it into four discrete components. The components include barite, bentonite, gases and drill chips or drilled solids.

The apparatus is generally related to a centrifugal pump of the type disclosed in U.S. Pat. No. 3,384,024 issued May 21, 1968, to William L. King.

The apparatus is a two stage, centrifugal pump and conditioner generally indicated by a reference numeral 10. The pump 10 includes a rotor housing 12 having a bearing pedestal 14 which rotatably supports a drive shaft 16 with the associated bearings and support structures generally designated by a reference numeral 18. The bearing pedestal 14 includes a generally cylindrical hollow sleeve 20 which terminates in a radially extending sleeve plate 22. A rotor housing body 24 is sealingly attached at one end to the sleeve plate 22. A generally circular housing face plate 26 is sealingly attached to the other end of the rotor housing body 24 to form the assembled rotor housing 12.

A two chambered rotor assembly 28 is encased within the rotor housing 12. The rotor assembly 28 includes a first chamber 30 defined by a rotatable casing 32 and an interchamber plate or wall 34. A second chamber 35 of larger diameter than the first chamber, is defined by the wall 34 and a rotatable casing 36, which is secured to the drive shaft 16 by appropriate mechanical means. A radially extending acceleration passage 38 is formed in the outboard end of the first chamber 30. A plurality of nozzles 40 are spaced about the periphery of the casing 32 to serve as exit ports to an interhousing space 42 between the rotor housing and the rotor assembly.

A weir 44 extends inwardly from the interchamber wall 34 to form a partial barrier between the first and second chambers 30 and 35. A radially extending acceleration passage 48 is formed in the wall 34 to connect the first and second chambers 30 and 35. An outboard wall 50 of the rotatable casing 36 has formed therein a gas outlet passage 52 with an inlet positioned near the center of the wall 50. The passage terminates in an interhousing space 53 between the rotor housing and the rotor assembly. The drill chips can be discharged from the interhousing space 42 near the bottom of the rotor housing at an outlet 43 and the gases can be discharged at an outlet 55 near the top of the rotor housing.

A mechanical seal 54 is located within an aperture formed in the center of the housing face plate 26. A discharge tube 56 having an outlet 58 and an inlet 62 extends through the aperture in the face plate 26 and the mechanical seal 54. In the preferred embodiment, the inlet 62 of the discharge tube 56 is connected to a pair of upstanding tubular pickup members 64 and 66. The first pickup member 64 extends radially and terminates in an angled pickup head 68 which is positioned near the end of the acceleration passage 48 at the periphery of the second chamber 35. The second pickup member 66 terminates in a pickup head 70 which is positioned intermediate the gas outlet 52 and the pickup head 68.

Formed in the face plate 26 is an inlet 72, which is connected by a passage 74 to the acceleration passage 38. The discharge tube 56 can be a single casing divided by a medial divider plate such that fluid collected by the pickup head 68 flows into one section of the discharge tube while fluid collected by pickup head 70 flows into a second section of the discharge tube 56. Alternatively, the discharge tube can be a single hollow tube which houses two discrete tubes, each of which terminates in one of the upstanding pickup members 64 or 66. In this case, the discharge tube would be sealed at its inboard end adjacent the pickup members 64 and 66 to prevent leakage of any fluid from the second chamber 35 into the discharge tube 56.

OPERATION

The drive shaft 16 is connected to a drive means and rotated at a speed such that the rotor assembly 28 will impart a centrifugal force to any incoming fluids. A charge of drilling mud enters the device at the inlet 72 and flows through the passage 74 into the acceleration passage 38. The acceleration path 38 is substantially shorter than the acceleration path 48, since the first chamber 30 has a smaller radial dimension than the second chamber 35. The consequence of this difference in radial dimension of the two chambers is that fluids in the acceleration paths 38 and 48 will be imparted different terminal velocities due to the different centrifugal forces being applied to them as a function of the radial displacement of the chambers. Thus, as the drilling mud, containing barite, bentonite, gases and drill chips (together with other valuable recoverable materials) enters the acceleration path 38, the rapid rotation of the rotor assembly 28 forces the fluid through the acceleration path and increases its radial velocity substantially over the short distance of the acceleration path 38. As the drilling mud enters the first chamber 30, the drill chips (on the order of 75 microns and larger in particle size) are forced toward the periphery of the casing 32 and are forced out through the nozzles 40 to be deposited in the interhousing space 42. Meanwhile, the gas containing barite and bentonite fractions of the fluid flows to the center of the chamber and is forced under the pressure head imposed by the incoming fluid through inlet 72 and passage 74 to flow over the weir 44 of the interchamber plate 34 and enter the acceleration passage 48. The longer passage 48 accelerates the fluid to a higher radial velocity than is experienced in the passage 38 of the first chamber 30 such that upon exiting the passage 48, the barite fraction (about 6-75 microns in particle size) and the bentonite fraction (about 0-6 microns in particle size) can be separated. The larger barite fraction of the drilling mud is forced to the outermost portion of the second chamber 35. The less dense bentonite fraction occupies the remaining space in the second chamber 35. Any gases dissolved within the drilling mud, due to the low density of gas, will be trapped in the center space and will exit through the gas outlet 52 to the interhousing space 53.

As the rotor assembly 28 spins, the barite fraction of the drilling mud is collected in the angled pickup head 68 of tube 64 and discharged through the appropriate section of discharge tube 56 to be recycled to the well or holding tank. The less dense bentonite fraction of the drilling mud will be collected in the angled pickup head 70 of tube 66 and will exit the discharge tube 56 to the well or a holding tank.

The rapid spinning of the rotor assembly 28 causes the drilling mud to be accelerated into the pickup section of the tubes 64 and 66 such that it exits the discharge tube 56 at fairly high pressures. For example, the drill chip fraction exiting the nozzles 40 is under very low pressure, while the barite fraction exiting tube 64 is under approximately 4,200 p.s.i., with the bentonite fraction exiting tube 66 under about 3,500 p.s.i.

Therefore, the present device is a two stage pump-conditioner which accepts a multi-fraction drilling mud, separates the drilling mud into its components (namely, drill chips, barite, bentonite and gas) and simultaneously pressurizes the exiting fluid so that it can be returned directly to the well or placed in an appropriate storage or holding tank. Each distinct major component of the drilling mud is separately recoverable and recyclable. Accordingly, the present invention, in a single pass of the fluid moving through the device, not only conditions, but pressure pumps the fluid to the desired locations.

FIG. 2 illustrates an alternative embodiment wherein a pickup member 76 terminating in an angled pickup head 78 is included along the discharge tube 56' and positioned to interrupt the path of the exiting drill chip fraction which exits the acceleration passage 38' in the first chamber 30'. By the addition of the tube 76 in the first chamber to collect the radially displaced drill chips in the first chamber, it can be assured that substantially all the drill chips in the incoming drilling mud can be collected by the tube 76 through its angle pickup head 78. Since the fluid and drill chips are pressurized by tube 76, it is possible to utilize methods such as those disclosed in U.S. Ser. No. 879,811, entitled "Combined Separator And Pump With Dirty Phase Concentrator", filed Feb. 21, 1978, to remove the water from the drill chips so that the water may be recycled. In this fashion, the drilling mud entering the second chamber through the acceleration passage 48' contains less drill chips than in the previous embodiment. The tube 76 and pickup head 78 must be fabricated from a highly abrasion resistant material which can withstand continuous attack by silica sand and similar materials which are known to attack metals under such conditions.

The present invention can accept and satisfactorily process drilling mud containing drill chips up to about 175 microns in size. A pre-screening system can be included prior to the inlet 72 should the drilling mud contain drill chips larger than 175 microns in size. Also, there is no need for a separate pumping system to collect the drill chip fraction of the drilling mud which exits the discharge tube 56' in the alternative embodiment, since the exit pressure from the tube 76 is on the order of 1,000 p.s.i.

In summary, the present invention provides a means to pump under pressure the individual components of a drilling fluid and simultaneously separate the major components of the fluid into recoverable fractions, using a two chamber centrifugal pump system. The present invention provides a complete package for drilling fluid pumping and conditioning capable of processing reasonable amounts of drilling fluid at the drill site in a single pass through the device to achieve complete density control, pressurization and drill chip removal.

The present invention comprises an enclosed rotor housing having an inlet for a liquid mixture and at least one outlet for the components of the mixture, a rotor assembly rotatably supported within the housing and divided into first and second chambers and drive means for rotating the rotor assembly. A first radial passage is formed in one end wall of the first chamber to connect the inlet to a peripheral portion of the first chamber. A plurality of nozzles are formed in the peripheral wall of the first chamber or a pickup means is stationarily mounted within the first chamber to collect the heaviest component, the drill chips. The nozzles discharge the drill chips to an interhousing space formed between the rotor housing and the rotor assembly and the pickup means is connected to the rotor housing outlet.

A peripheral portion of the second chamber is connected to the center of the first chamber by a radial passage formed in the end wall dividing the two chambers. First and second pickup means are stationarily mounted in the second chamber. The first pickup means collects the next heaviest component, the barite, near the periphery of the second chamber and the second pickup means collects the third heaviest component, the bentonite, intermediate the periphery and the center of the second chamber. A means for collecting the lightest component, the gases, can be a passage formed in the other end wall of the second chamber with an inlet near the center of the second chamber and an outlet in the interhousing space between the rotor housing and the rotor assembly.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A centrifugal pump for selectively separating different weight components of a liquid-solids mixture comprising: a stationary outer housing having an inlet communicating with the interior of said housing; a rotor assembly having a first and a second chamber spaced apart by a common wall, said first chamber being defined by a first casing and a portion of one side of said common wall, said first casing having a wall portion integral with said common wall and extending toward said housing inlet and terminating in spaced relation from said common wall, outlet means providing communication between said first chamber and the exterior of said housing, radially extending acceleration passages in the end wall of said first casing providing communication between the inlet of said housing and the radially outer peripheral interior of said first chamber, said second chamber being defined by a second casing and the opposite side of said common wall, said second casing having a wall portion integral with and extending in an opposite direction from the wall portion of said first casing and terminating in spaced relation from said common wall, radially extending acceleration passages in said common wall providing communication between the radially inner portion of the interior of said first chamber and the radially outer portion of the interior of said second chamber; a first pickup stationarily mounted within said second chamber having a pickup inlet positioned near the periphery of said second chamber for collecting components of the liquid-solids mixture; a second pickup stationarily mounted within said second chamber having a pickup inlet positioned inwardly of the pickup inlet of said first pickup means for collecting components of the liquid-solids mixture of a weight different from the weight of the components collected by said first pickup means; outlet means from said housing; means providing communication between said first and second pickup means and said outlet means disposed to extend axially of said rotor assembly; and means for rotatingly supporting said rotor assembly to permit rotation thereof relative to said outer housing about an axis parallel to said communication means.

2. A pump according to claim 1 wherein said outlet means providing communication between said first chamber and the exterior of said housing includes at least one outlet nozzle in the wall portion of said first casing.

3. A pump according to claim 1 wherein said outlet means providing communication between said first chamber and the exterior of said housing includes a stationarily mounted pickup means having a pickup inlet positioned near the perihery of said first chamber.

* * * * *